United States Patent [19]
Roche

[11] Patent Number: 5,368,001
[45] Date of Patent: Nov. 29, 1994

[54] FUEL HANDLING SYSTEM

[75] Inventor: Ronald H. Roche, Cass City, Mich.

[73] Assignee: Walbro Corporation, Cass City, Mich.

[21] Appl. No.: 184,272

[22] Filed: Jan. 21, 1994

[51] Int. Cl.[5] .......................................... F02M 37/04
[52] U.S. Cl. ................................. 123/510; 123/516; 137/587
[58] Field of Search .............. 123/509, 510, 514, 516; 137/587, 442, 558, 172

[56] References Cited

U.S. PATENT DOCUMENTS

| | | | |
|---|---|---|---|
| 4,107,052 | 8/1978 | Yoshino et al. | 137/172 |
| 4,328,825 | 5/1982 | Bishai | 137/172 |
| 4,372,847 | 2/1983 | Lewis | 123/510 |
| 4,763,684 | 8/1988 | Kelch | 123/516 |
| 4,795,556 | 1/1989 | Brotea et al. | 123/510 |
| 4,809,666 | 3/1989 | Baltz | 123/510 |
| 4,855,041 | 8/1989 | Church et al. | 137/587 |
| 4,856,483 | 8/1989 | Beavis et al. | 123/510 |
| 4,898,140 | 2/1990 | Pages | 123/510 |
| 5,036,822 | 8/1991 | Kojima | 123/510 |
| 5,103,793 | 4/1992 | Riese et al. | 123/516 |
| 5,119,790 | 6/1992 | Olson | 123/510 |
| 5,146,901 | 9/1992 | Jones | 123/516 |
| 5,170,764 | 12/1992 | Tuckey | 123/516 |
| 5,195,494 | 3/1993 | Tuckey | 123/510 |

*Primary Examiner*—F. Rollins Cross
*Assistant Examiner*—Thomas N. Moulis
*Attorney, Agent, or Firm*—Barnes, Kisselle, Raisch, Choate, Whittemore & Hulbert

[57] ABSTRACT

A fuel handling system for an internal combustion engine having a reservoir for receiving fuel under low pressure from a remote gas tank and a fuel pump for delivering the fuel under high pressure to a fuel injector of the engine while providing vapor separation. The reservoir has an inlet for receiving fuel from the tank, an outlet for removing fuel from the reservoir and delivering it to the engine, a fuel return for returning fuel not used by the engine, a drain for removing water, and a vapor vent for removing fuel vapors from a gas dome above the liquid within the reservoir. The inlet has a valve controlled by a float in the reservoir for admitting fuel to maintain the level of liquid in the reservoir so that the pump is supplied with fuel. To remove fuel, a fuel pickup is coupled to an inlet of the pump which has its outlet coupled to the reservoir outlet. The pickup has a diaphragm for filtering fuel entering the pump while preferably preventing the admission of gas or water. Preferably, a water sensor in the reservoir provides an electrical signal when it is immersed in water so that the drain can be opened to remove the water, preferably before the pickup is immersed and fuel flow to the pump and engine is cut off.

19 Claims, 1 Drawing Sheet

FUEL HANDLING SYSTEM

FIELD OF THE INVENTION

This invention relates to fuel handling systems for internal combustion engines and more particularly to a fuel handling system for a fuel-injected marine internal combustion engine.

BACKGROUND OF THE INVENTION

Modern fuel injection systems have been used for supplying fuel to gasoline internal combustion engines for automobiles because their ability to precisely meter fuel flow and accurately control the mixture of fuel and air delivered to an engine typically dramatically improves engine performance while reducing engine exhaust gas emissions. In operation, an electric fuel pump transfers gasoline under high pressure directly from a remote gas tank, along a fuel line, and to a fuel rail connected to individual fuel injectors of the fuel injection system. During operation, excess fuel not used by the injectors during periods of low engine demand is returned to the gas tank, while fuel that has vaporized is mixed with air entering the engine or stored in an activated-charcoal canister.

Unfortunately, unused fuel returned to the gas tank can vaporize or become aerated and/or foamy which can lean out the air-fuel mixture delivered to the engine by the fuel pump. Since two cycle engines depend upon a constant predictable stream of fuel mixed with oil to maintain engine temperature, a lean operating condition can cause the engine to stall or, even worse, overheat.

Another problem common to marine engine applications is providing a supply of liquid fuel from the remote fuel tank to the engine. Conventional marine fuel handling systems typically use a paper element water filter in the fuel line between the tank and engine to prevent water in the fuel from entering the engine during operation. As this filter becomes saturated with water it can restrict fuel flow to the engine causing it to run poorly on a lean air-fuel mixture, possibly overheating the engine, or completely block flow causing the engine to stall, possibly stranding a boater far from shore. This type of filter can also collapse or become porous allowing water to pass directly through the filter and into the engine which can damage it.

As a result of more stringent emissions regulations and customer demand for better performance, fuel injection systems for use with marine internal combustion engines are under development. However, because the marine environment differs considerably from vehicle operating environments, considerable challenges are being faced by designers. For example, in applications where it is desired to mate fuel injection to outboard motors, Coast Guard regulations do not allow the use of a pressurized fuel line from the remote gas tank to the engine to prevent fuel from leaking, igniting, and possibly causing injury. Coast Guard regulations also prohibit returning excess fuel not used by the fuel injectors to the gas tank, as is typically done in automotive fuel injection systems.

SUMMARY OF THE INVENTION

A fuel handling system for an internal combustion engine, such as a marine outboard engine, having a reservoir for receiving fuel under low pressure from a remote gas tank, and a fuel pump, preferably received in the reservoir, for delivering the fuel under high pressure from the reservoir to a fuel injector of the engine while preferably providing separation of fuel vapor from liquid fuel. The reservoir has an inlet for receiving fuel from the fuel tank, an outlet in communication with an outlet of the fuel pump for removing fuel from the reservoir and delivering it to the engine, a fuel return inlet for returning fuel not used by the engine to the reservoir, a drain for removing water that has accumulated within the reservoir and a vapor vent outlet for removing fuel vapors from a gas dome above the liquid within the reservoir.

To remove fuel from the reservoir while allowing passage of only liquid fuel to the pump, the inlet of the fuel pump communicates with a fuel pickup received within the reservoir and its outlet communicates with the reservoir outlet, which in turn preferably communicates with a fuel rail leading to the fuel injector. The pickup has a filter diaphragm for filtering liquid fuel as it is admitted into the fuel pump while preventing the admission of vapor, aerated fuel, foam, water or air into the pump. Preferably, there is a fuel bypass in communication with the outlet side of the fuel pump to return excess liquid and vaporized fuel for maintaining a constant fuel line pressure during engine operation.

To controllably admit fuel from the remote tank into the reservoir, the inlet has a valve in operable communication with a float within the reservoir for maintaining the level of liquid in the reservoir so that the fuel pump is supplied with fuel during operation. For removing water that has accumulated within the reservoir at the bottom of the reservoir, the drain has a manually operable drain cock.

Preferably, the fuel handling system has a water sensor with a sensing element in the reservoir for generating an electrical signal when the sensing element is immersed in water so that the drain cock can be opened to remove the water. Preferably, the sensor is positioned relative to the pickup diaphragm so that it detects water in the reservoir before the pickup diaphragm is immersed in water and fuel flow to the pump and engine is cut off.

Objects, features and advantages of this invention are to provide a fuel handling system which enables fuel to be transported from a remote fuel tank under low pressure and pressurized at the engine for supplying highly pressurized fuel to a fuel injector of an internal combustion engine, prevents water, aerated or vaporized fuel, foam, or air from being pumped by the fuel pump into the engine, filters the liquid fuel entering the pump, provides fuel vapor separation, allows pressurized fuel unused by the engine to be recycled without being returned to the remote fuel tank, provides a signal before water within the reservoir of the system reaches a level where the fuel supply to the engine could be cut off, enables water to be drained from the reservoir to prevent water from accumulating within the reservoir, can be mounted under the cowling of a marine outboard engine in close proximity to the engine, is of compact construction, and is rugged, durable, of simple design, of economical manufacture and easy to assemble and use.

BRIEF DESCRIPTION OF THE DRAWINGS

These and other objects, features and advantages of this invention will be apparent from the following detailed description of the best mode, appended claims, and accompanying drawing in which:

DETAILED DESCRIPTION OF THE INVENTION

Figure 1:
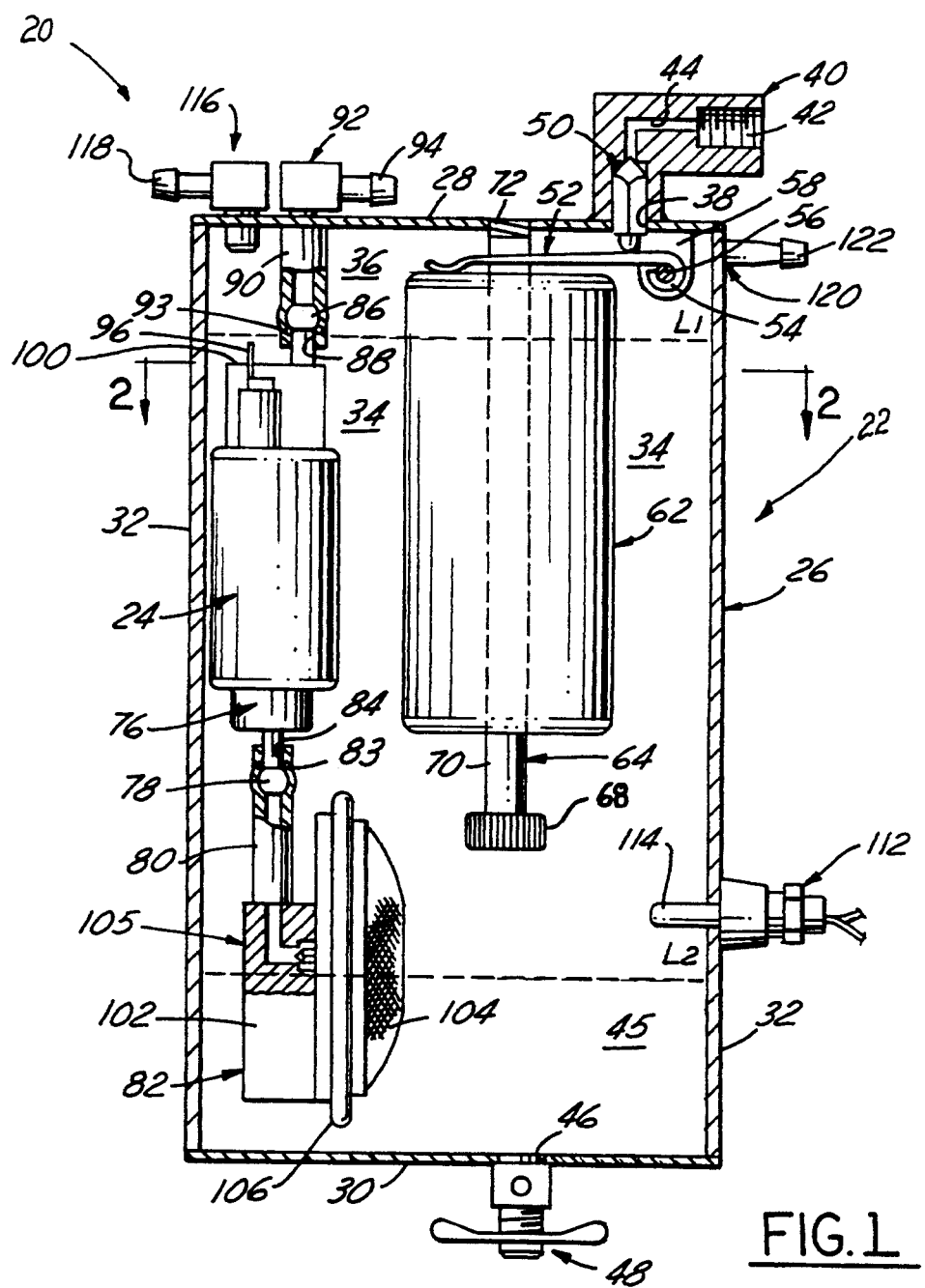
FIG. 1 is a side sectional view of a fuel handling system embodying this invention.
Figure 2:
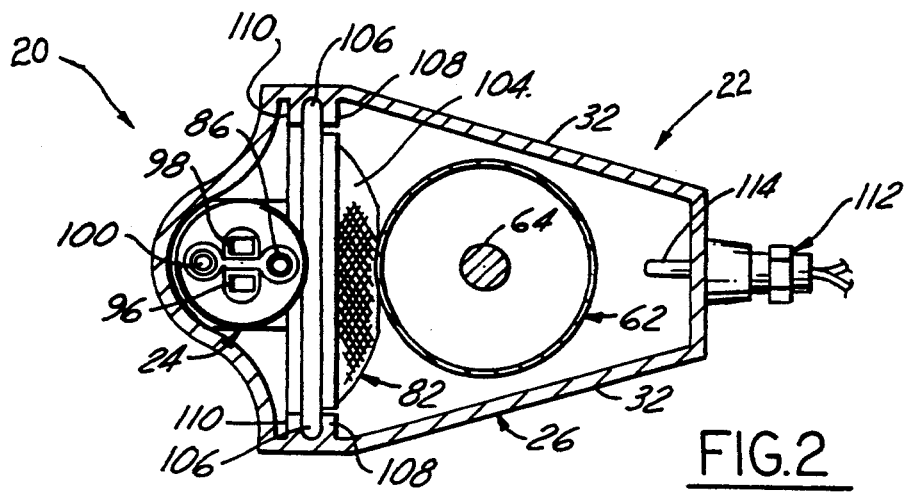
FIG. 2 is a top sectional view of the fuel handling system taken along line 2—2 of FIG. 1.

With reference to the drawings, FIGS. 1 & 2 illustrate a fuel handling system 20 of this invention for receiving fuel under low pressure from a remote source, such as a gas tank (not shown), and delivering the fuel under high pressure to a fuel injector of an internal combustion engine, such as a marine outboard engine (not shown), while preferably providing vapor separation of fuel that has vaporized. The fuel handling system 20 includes a reservoir 22 for receiving fuel from the remote fuel tank and a fuel pump 24 for removing fuel from the reservoir 22 and delivering it under high pressure to the fuel-injected internal combustion engine.

The fuel handling system 20 has a housing 26 with a top wall 28 and a bottom wall 30 spaced apart by a preferably extruded sidewall 32 defining the reservoir 22 for containing liquid fuel 34 (between dotted lines $L_1$ & $L_2$ in FIG. 1) therein while maintaining a gas dome 36 above the fuel 34, as is indicated above the dotted line, $L_1$, at the top of the reservoir 22, to receive vaporized fuel. To admit fuel from the remote source into the reservoir 22, the top wall 28 has an inlet opening 38 and a fitting 40 mounted over the opening 38 with a bore 42 that is threaded for receiving a complementary threaded fitting of a fuel line (not shown) from the tank. However, if desired, the fuel line fitting (not shown) may be pressed into fitting 40. When the fuel line is connected, it communicates with a passage 44 in the fitting 40 and the inlet opening 38. To remove water 45 that has accumulated within the reservoir 22, such as is indicated in FIG. 1 below the dotted line, $L_2$, at the bottom of the reservoir, the bottom wall 30 has a drain opening 46 with a manually operable drain cock 48 extending therefrom.

As is shown in FIG. 1, an inlet valve 50 is received in the inlet opening 38 for controlling the admission of fuel into the reservoir 22. The valve 50 rides on a lever 52 having one end 54 curled around a pivot 56 attached to the housing top wall 28 by a post 58. The lever 52 has a curved distal end 60 that rides on top of a float 62 received in the reservoir 22. The float 62 is axially guided on a central rod 64 to urge the valve 50 to close the inlet passage 44 to prevent the admission of fuel when liquid within the reservoir 22 has reached a predetermined level, for example $L_1$, and unseat the valve 50 from the passage 44 to allow fuel to enter the reservoir 22 when the liquid level within the reservoir 22 drops below $L_1$ to adequately supply the pump 24 with fuel.

As is shown in FIG. 1, the guide rod 64 has its head end 68 within the reservoir 22 to limit the downward axial movement of the float 62 during operation and its shank 70 extending upwardly through the float 62. A threaded end 72 of the rod 64 is received in a complementary opening in the housing top wall 28 to secure the rod 64 to the reservoir housing 26. However, if desired, the guide rod 64 may be pressed like a rivet into the housing top wall 28 or cast as part of the housing 26. Although the float 64 shown in FIGS. 1 & 2 is a monkey-pole type float, it could be of another suitable construction, such as, for example, a float attached to one end of a movable arm, like that used in carburetors or toilets, to controllably admit fuel into the reservoir 22.

To remove fuel from the reservoir 22, the fuel pump 24 has a housing 76 with an inlet nipple 78 received in an opening 84 in an outlet connector 80 of a fuel pickup 82 and which is fluid tightly sealed by a grommet 83 in the opening 84. At its opposite end, an outlet nipple 86 of the pump 24 is received in an opening 88 in a connector 90 of a fuel line coupling 92 secured to the top wall 28 of the reservoir housing. To fluid tightly seal the nipple 86 within the connector 90, a grommet 93 is received in its opening 88. The coupling 92 has another nipple 94 for connection with a fuel rail (not shown) leading to the fuel injector. At its outlet end, the pump 24 has a pair of electrical terminals 96, 98 for supplying electrical power to the pump motor within the housing 76 when connected to a power supply (not shown). Preferably, the pump 24 is constructed in accordance with U.S. Pat. No. 4,500,270, the disclosure of which is incorporated herein by reference and hence will not be described in further detail.

As is depicted more clearly in FIG. 2, should the pressure of fuel within the fuel pump 24 become too great, the outlet end of the pump 24 preferably has a pressure relief valve 100 for expelling the excessively pressurized fuel from the pump 24 back into the reservoir 22. A fuel pump having such a relief valve is disclosed in U.S. Pat. No. 5,248,223, the disclosure of which is hereby incorporated by reference.

The fuel pickup 82 has a housing 102 received in the reservoir 22 with a generally frustoconical inlet filter diaphragm 104 extending therefrom for admitting only liquid fuel to the fuel pump inlet 78 while filtering the fuel before it enters the inlet 78. As is shown more clearly in FIG. 2, the pickup housing 102 has an annular ring 106 encircling it which is frictionally retained and supported between pairs of ribs 108, 110 extending inwardly from the reservoir housing sidewall 32 on opposite sides of the ring 106. Preferably, both pairs of ribs 108, 110 are integrally extruded as part of the sidewall 32.

Preferably, the filter diaphragm 104 is constructed of a fine plastic wire mesh that is operably connected to an inlet valve 105 within the pickup housing 102 for allowing the passage of only liquid fuel through the pickup 82 and into the fuel pump 24 during operation while preventing aerated or vaporized fuel, foam, water, or air from entering the pump 24. Preferably, the pickup 82 is constructed in accordance with U.S. Pat. No. 5,170,764, the disclosure of which is incorporated herein by reference and hence will not be described in further detail.

Preferably, the reservoir housing 26 has a water sensor 112 with a sensing element 114 that extends through the housing sidewall 32 into the reservoir 22 for generating an electrical signal when the element 114 is immersed in water so that the drain cock 48 can be opened to remove the water. Preferably, the sensing element 114 is positioned relative to the pickup diaphragm 104, such as is shown in FIG. 1, so that it detects water in the reservoir 22 before the entire diaphragm 104 becomes fully immersed in water completely stopping the flow of fuel to the fuel pump 24 and the engine.

Preferably, to return fuel not used by the fuel injector to the reservoir 22 to maintain a constant fuel pressure at the injector, there is a fuel bypass (not shown), such as, for example, a bypass valve, demand regulator, bypass regulator, or pressure regulator, in communication with the outlet side of the fuel pump 24 and a fuel return fitting 116 received through an opening in the top wall 28 of the housing 26. As is shown in FIG. 1, the fitting 116 has a nipple 118 extending therefrom for attachment to a fuel return line (not shown) from the fuel bypass or engine.

Since fuel from the tank and, especially, hot fuel returned from the engine can vaporize and be received within the gas dome 36, the housing sidewall 32 has a vapor vent outlet 120 in communication with the dome 36 and a nipple 122 extending outwardly from the wall 32 for connection with a hose (not shown) preferably in communication with engine vacuum for removing the fuel vapor from the gas dome 36. Preferably, fuel vapor removed from the gas dome 36 is either mixed with the intake air entering the engine for combustion therewith or absorbed within an activated-charcoal canister (not shown) until it can be condensed and removed from the canister to be preferably mixed with intake air entering the engine.

In use, the fuel handling system 20 is preferably installed in close proximity to the engine, such as under the cowling of the marine outboard motor, to satisfy Coast Guard regulations that require fuel to be transported under low pressure from the remote fuel tank to the vicinity of the engine. Preferably, the reservoir housing 26 is installed close to the engine so that fuel not used by the injector can be returned to the reservoir 22 using only a very short fuel return line and not to the remotely located fuel tank in further conformance with these regulations which limit pressurized fuel lines to a maximum length of one foot.

In operation, when the level of liquid is below $L_1$, the inlet valve 50 opens admitting fuel from the fuel tank through the inlet fitting 40 and into the reservoir 22. When the level of liquid in the reservoir 22 approaches $L_1$, the float 62 seats the valve 50 within the fitting 40 preventing additional fuel from the tank from entering the reservoir 22. In response to demand from the engine, the fuel pump 24 draws fuel from the reservoir 22 through the pickup 82 and expels it under high pressure through the outlet coupling 92 into the fuel rail where it is received by the fuel injector.

Should the liquid level fall below the filter diaphragm 104 of the pickup 82 during operation substantially exposing it to aerated fuel, foam, air and/or fuel vapor, the pressure differential between the gas within the reservoir 22 and the diaphragm 104 caused by the suction of the pump 24 will preferably draw the diaphragm 104 toward the pickup housing 102 closing the inlet valve 105 within the housing 102 thereby preventing its passage into the fuel pump 24. Should the diaphragm 104 become fully immersed in water, the diaphragm 104 will similarly close the inlet valve 105 to block it from entering the pump 24 and prevent it from damaging the fuel injector and/or engine. Preferably, however, the water sensor 112 will generate a signal when it becomes immersed in water so that the drain cock 48 can be opened to drain it from the reservoir 22 before the pickup 82 is completely immersed in water.

Should pressurized fuel from the pump 24 not be used by the injector, the excess fuel is returned from the engine through the fuel return fitting 116 to the reservoir 22 for reuse. Vaporized fuel in the gas dome 36 is drawn by preferably engine suction through the vapor vent outlet 120 in the reservoir housing sidewall 32 and out of the reservoir 22 where it is directly mixed with the intake air for minimizing hydrocarbon emissions during engine operation or delivered to a charcoal canister for storage and preferably subsequent mixing with the intake air during engine operation.

What is claimed is:

1. A fuel handling system for an internal combustion engine having at least one fuel injector comprising: a closed reservoir for receiving liquid fuel therein and maintaining a gas dome above liquid fuel in said reservoir and having at least one inlet for receiving fuel from a remote source, a vent for permitting the removal of fuel vapor from said gas dome, a fuel pump in said reservoir and having an inlet in communication with said reservoir for delivering fuel through its outlet under high pressure from said reservoir to the fuel injector, and a pickup in said reservoir in fluid flow communication with said inlet of said fuel pump and which filters fuel before it enters said pump inlet while preventing other liquids and gases from entering said pump inlet.

2. The fuel handling system of claim 1 wherein said pickup comprises a diaphragm in communication with an inlet valve for filtering liquid fuel entering said pump inlet and allowing liquid fuel to enter said pump inlet while preventing fuel vapor, aerated fuel, foam, water or air from entering said pump inlet.

3. The fuel handling system of claim 1 also comprising a drain in said reservoir for removing water that has accumulated in said reservoir.

4. The fuel handling system of claim 3 also comprising a sensor operably associated with said reservoir for providing a signal when water within said reservoir has reached a predetermined level.

5. The fuel handling system of claim 1 also comprising a second inlet in said reservoir for receiving fuel not delivered to the engine by the fuel injector.

6. The fuel handling system of claim 1 also comprising an inlet valve in operable communication with a float in said reservoir for admitting fuel through said inlet into said reservoir when fluid within said reservoir has dropped below a predetermined level to maintain said predetermined level of fluid within said reservoir.

7. A fuel handling system for a marine internal combustion engine having at least one fuel injector comprising: a closed reservoir for receiving liquid fuel therein and maintaining a gas dome above liquid fuel in said reservoir, said reservoir having at least one inlet for receiving fuel from a remote source, an outlet for enabling fuel to be withdrawn from said reservoir and a vent for permitting the removal of fuel vapor from said gas dome, an inlet valve in operable communication with said inlet of said reservoir for selectively admitting fuel through said inlet into said reservoir, a fuel pump in said reservoir and having an inlet in communication with said reservoir for delivering fuel through said outlet of said reservoir under high pressure to the fuel injector, and a pickup in said reservoir in fluid flow communication with said inlet of said fuel pump and which filters fuel before it enters said pump inlet while preventing other liquids and gases from entering said pump inlet.

8. The fuel handling system of claim 7 wherein said pickup comprises a diaphragm in communication with an inlet valve for filtering liquid fuel entering said pump inlet and allowing liquid fuel to enter said pump inlet while preventing fuel vapor, aerated fuel, foam, water or air from entering said pump inlet.

9. The fuel handling system of claim 7 also comprising a float in said reservoir in operable communication with said inlet valve for admitting fuel through said inlet of said reservoir into said reservoir when fluid within said reservoir has dropped below a predetermined level to maintain said predetermined level of fluid within said reservoir.

10. The fuel handling system of claim 7 also comprising a drain in said reservoir for removing water that has accumulated in said reservoir.

11. The fuel handling system of claim 10 also comprising a sensor in said reservoir for providing a signal upon being immersed in water when water within said reservoir has reached a predetermined level so that said drain can be opened to remove water from said reservoir.

12. The fuel handling system of claim 11 wherein said sensor is positioned relative to said pickup to provide said signal before said pickup is fully immersed in water.

13. The fuel handling system of claim 7 also comprising a second inlet in said reservoir for receiving fuel returned from the internal combustion engine.

14. The fuel handling system of claim 7 wherein fuel vapor in said gas dome is vented through said vent in said reservoir to the engine.

15. A fuel handling system for receiving fuel under low pressure from a remote fuel tank and delivering the fuel under high pressure to an internal combustion engine having at least one fuel injector, said fuel handling system comprising: a closed reservoir for receiving liquid fuel therein and maintaining a gas dome above fuel in said reservoir, said reservoir having a first inlet for receiving fuel under low pressure from the remote fuel tank, an outlet in fluid flow communication with the engine for enabling fuel to be removed from said reservoir and delivered to the engine, a second inlet for receiving fuel returned from the engine and a vent for permitting the removal of fuel vapor from said gas dome; an inlet valve in operable communication with a float in said reservoir for selectively admitting fuel through said first inlet into said reservoir when fluid within said reservoir has dropped below a predetermined level to maintain said predetermined level of fluid within said reservoir; a fuel pump in said reservoir and having an inlet in communication with said reservoir for delivering fuel through said outlet of said reservoir under high pressure to the fuel injector; and a pickup in said reservoir in fluid flow communication with said inlet of said fuel pump and having a diaphragm in communication with an inlet valve for filtering liquid fuel entering said pump inlet and allowing liquid fuel to enter said pump inlet while preventing fuel vapor, aerated fuel, foam, water or air from entering said pump inlet.

16. The fuel handling system of claim 15 also comprising a drain in said reservoir for removing water that has accumulated in said reservoir.

17. The fuel handling system of claim 16 also comprising a sensor in said reservoir for providing a signal upon being immersed in water when water within said reservoir has reached a predetermined level so that said drain can be opened to withdraw water from said reservoir.

18. The fuel handling system of claim 17 wherein said sensor is positioned within said reservoir relative to said pickup to provide said signal before said pickup is fully immersed in water.

19. The fuel handling system of claim 15 wherein fuel vapor in said gas dome is vented through said vent in said reservoir to the engine.

* * * * *